United States Patent
Yoshitani

(10) Patent No.: US 8,248,675 B2
(45) Date of Patent: Aug. 21, 2012

(54) IMAGE-READING APPARATUS

(75) Inventor: Akihiro Yoshitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 12/554,136

(22) Filed: Sep. 4, 2009

(65) Prior Publication Data

US 2010/0060951 A1    Mar. 11, 2010

(30) Foreign Application Priority Data

Sep. 9, 2008 (JP) ................................. 2008-231191

(51) Int. Cl.
*H04N 1/04* (2006.01)
(52) U.S. Cl. ......... 358/474; 358/482; 358/448; 358/461
(58) Field of Classification Search .................. 358/474, 358/482, 448, 461, 1.15
See application file for complete search history.

(56) References Cited

U.S. PATENT DOCUMENTS 6,441,915 B1 * 8/2002 Imaizumi et al. ............ 358/1.15
6,559,976 B1 * 5/2003 Hirota ........................... 358/3.03

FOREIGN PATENT DOCUMENTS

| JP | 06-334814 A | 12/1994 |
|---|---|---|
| JP | 2000-244717 A | 9/2000 |
| JP | 2006-033386 A | 2/2006 |
| JP | 2006-340232 A | 12/2006 |

\* cited by examiner

*Primary Examiner* — Houshang Safaipour
(74) *Attorney, Agent, or Firm* — Canon USA Inc IP Division

(57) ABSTRACT

An image-reading apparatus that reads an image of an original includes an array sensor including photoelectric-conversion elements linearly arranged; an optical system configured to form the image of the original onto the array sensor; a signal-processing circuit configured to convert outputs of the array sensor into digital signals and sequentially output pixel values of pixels that constitute a line; a sample-rate converter configured to sequentially receive the pixel values of the pixels that constitute the line output from the signal-processing circuit, convert spatial sample intervals of the line, and output the resultant pixel values; a data table created by reflecting aberration characteristics of the optical system therein; and a controller configured to control the sample-rate converter using data in the data table.

8 Claims, 13 Drawing Sheets

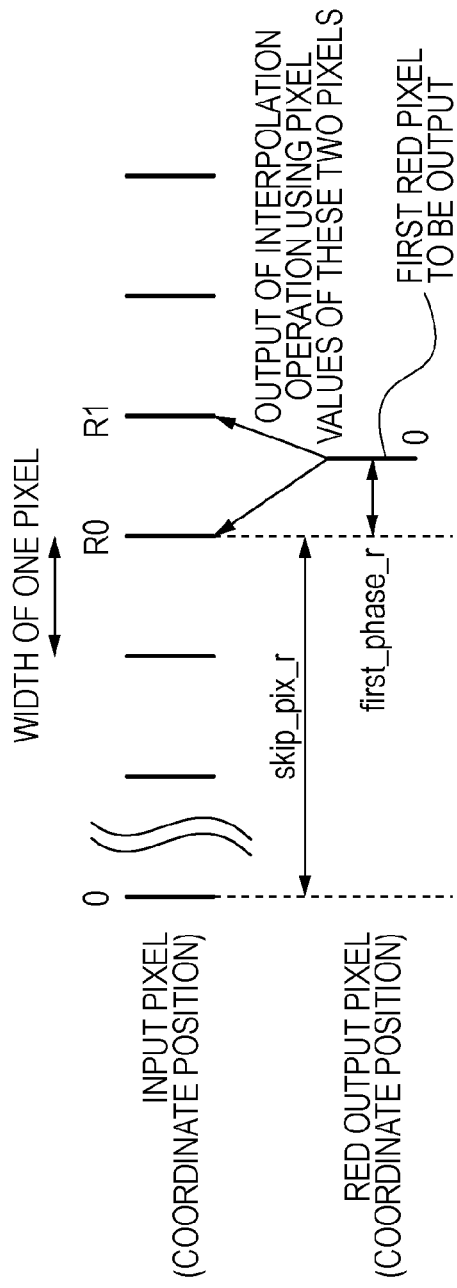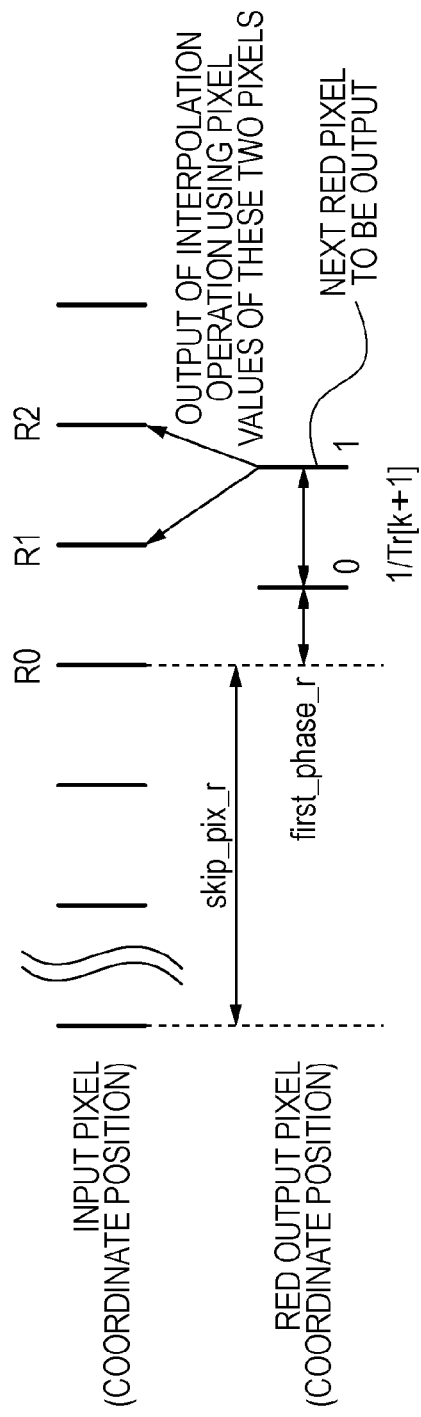

FIG. 12
(A) RGB PIXEL DISPLACEMENT AT PIXEL POSITION ON ORIGINAL
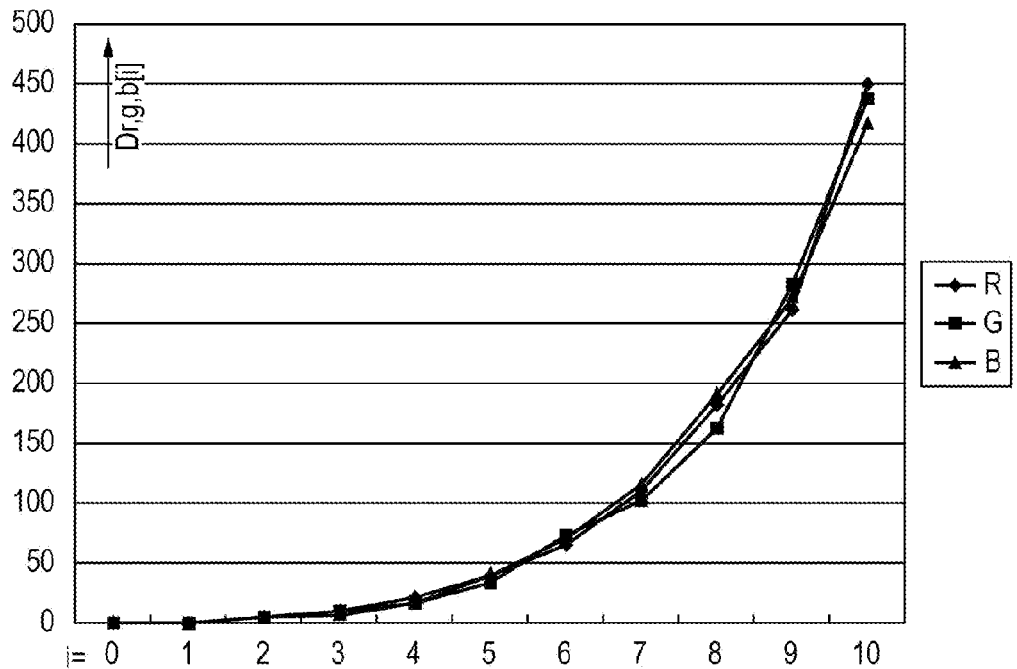
(B) ORIGINAL
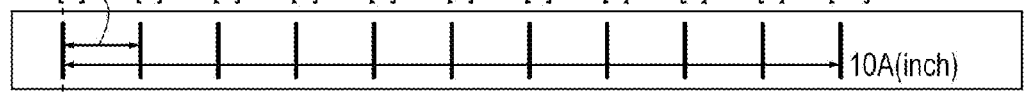
(C) IMAGE DATA READ BY OPTICAL SYSTEM WITH NO DISTORTION
(IT IS ASSUMED THAT RGB CORRESPOND TO EACH OTHER)
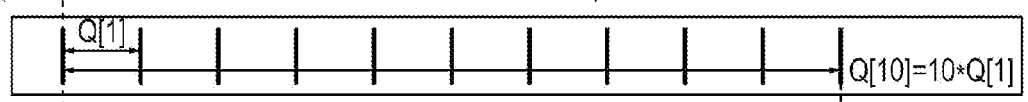
(D) IMAGE DATA READ BY OPTICAL SYSTEM WITH DISTORTION
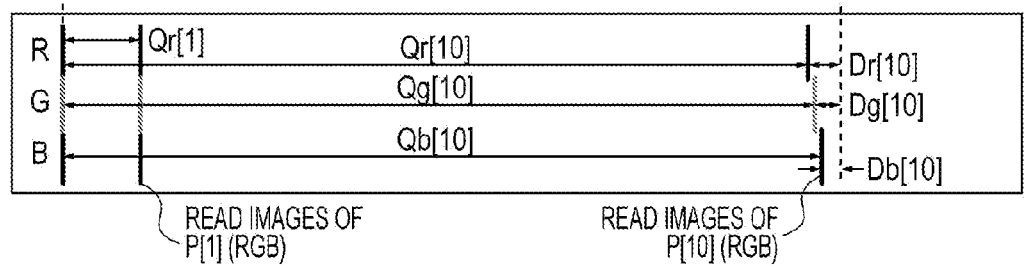

IMAGE-READING APPARATUS

BACKGROUND OF THE INVENTION

1. Field of the Invention

The present invention relates to image-reading apparatuses such as optical scanners.

2. Description of the Related Art

Optical scanners serving as image reading apparatuses include those of the so-called contact image sensor (CIS) type using unit-magnification optical systems and those of the so-called charge-coupled device (CCD) sensor type using reduction optical systems. The scanners of the CCD-sensor type read original images using reading units including CCD line sensors and reduction optical systems by raster scanning of the sensors, convert signals from each pixel into image data, and output the data. The scanners read two-dimensional images by a combination of the raster scanning of the line sensors in a main scanning direction and relative scanning of the line sensors to originals in a sub-scanning direction. Japanese Patent Laid-Open No. 2000-244717, for example, describes a scanner of this type.

In order to reduce the size of the scanners of the CCD-sensor type, the reduction optical systems embedded in the scanners are desirably made more compact. However, as the optical path lengths of the optical systems are reduced for the compact optical systems, various aberrations such as distortion and chromatic aberration of the optical systems are increased in degree due to lack of margins in optical design.

Increases in the degrees of aberrations cause the following problems. First, scaling factors of images formed on the line sensors in central portions and those in peripheral portions differ from each other due to distortion. Accordingly, the resolutions of the read image data in the central portions and those in the peripheral portions differ from each other. Furthermore, differences in the resolutions between the central portions and the peripheral portions vary in terms of color due to chromatic aberration.

SUMMARY OF THE INVENTION

The present invention is directed to an image-reading apparatus with a small-scale circuit configuration capable of reducing effects of aberrations of an optical system.

According to an aspect of the present invention, an image-reading apparatus that reads an image of an original includes an array sensor including photoelectric-conversion elements linearly arranged; an optical system configured to form the image of the original onto the array sensor; a signal-processing circuit configured to convert outputs of the array sensor into digital signals and sequentially output pixel values of pixels that constitute a line; a sample-rate converter configured to sequentially receive the pixel values of the pixels that constitute the line output from the signal-processing circuit, convert spatial sample intervals of the line, and output the resultant pixel values; a data table created by reflecting aberration characteristics of the optical system therein; and a controller configured to control the sample-rate converter using data in the data table.

Further features of the present invention will become apparent from the following description of exemplary embodiments with reference to the attached drawings.

BRIEF DESCRIPTION OF THE DRAWINGS

FIGS. 7A and 7B illustrate how distortion is corrected when first and second pixels, respectively, are output.

FIGS. 12A to 12D illustrate degrees of the pixel displacement and the color misregistration.

DESCRIPTION OF THE EMBODIMENTS

Figure 11:
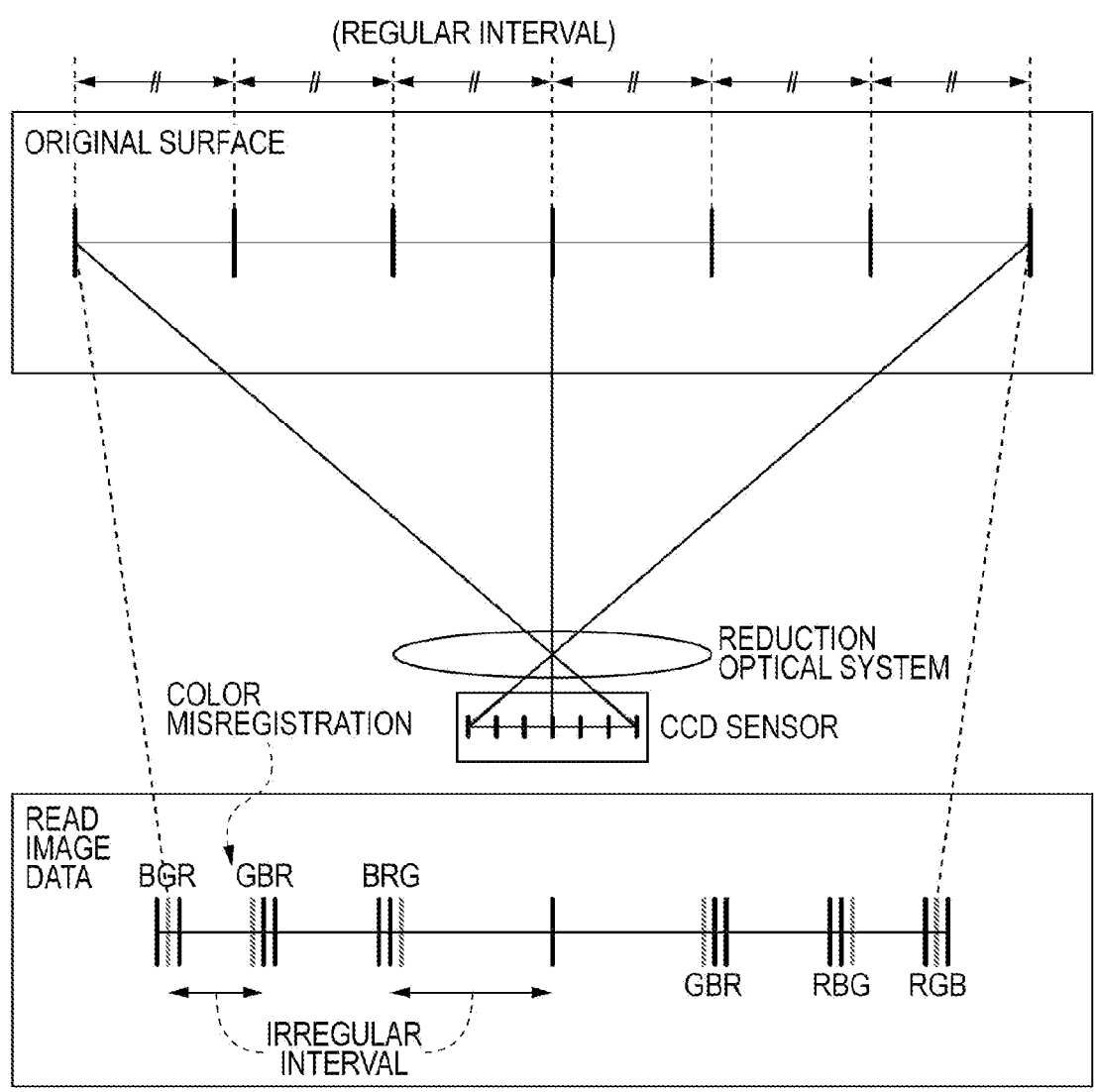
FIG. 11 illustrates pixel displacement and color misregistration caused by aberrations of a reduction optical system.

First, distortion and chromatic aberration serving as aberrations in optical systems will be described. As shown in FIG. 11, the resolution of read images varies in accordance with the position in a line read by raster scanning. Furthermore, coordinate positions of sensor pixels corresponding to the same positions on an original vary in terms of red, green, and blue (RGB) components, resulting in color misregistration of the read image data.

FIGS. 12A to 12D illustrate effects of the aberrations in a scanning apparatus using a reduction optical system having large aberrations resulting from a reduced optical path length. FIGS. 12A to 12D show how displacement and color misregistration of images read at a resolution d (dpi) occur. It is assumed that the center of an original corresponds to that of a CCD sensor in a main scanning direction. FIG. 12C illustrates image data when sample points P[i] at distances of i×A inches (where i and A indicate an integer and a fixed value, respectively) from the center on the original are read by an ideal optical system having no aberrations. The distances (i.e., the numbers of pixels) between P[0] and P[i] are iAd, and are in proportion to i. These values are defined as Q[i]. However, the images cannot be read in this ideal manner by an optical system having aberrations. Moreover, chromatic aberration also causes differences in the distances between P[0] and P[i] of each of the RGB components. FIG. 12D illustrates image data including P[0] and P[i] of the RGB components. When the distances between P[0] and P[i] of each of the RGB components are defined as Qr[i], Qg[i], and Qb[i], respectively, amounts of pixel displacement (pixels) Dr[i], Dg[i], and Db[i] at the points P[i] on the original are defined as follows:

$$Dr[i] = Q[i] - Qr[i]$$

$$Dg[i] = Q[i] - Qg[i]$$

$$Db[i] = Q[i] - Qg[i]$$

The differences among these three values are the amounts of color misregistration at the points P[i].

FIG. 12A illustrates the amounts of the pixel displacement Dr[i], Dg[i], and Db[i] measured using an optical system with distortion. As is clear from FIG. 12A, no pixel displacement or no color misregistration were observed at the center of the sensor. However, the amounts of the pixel displacement became larger than proportional multiples of the distances from the center of the sensor, that is, the so-called pixel displacement occurred as the sample position became closer to the ends of the sensor. As regards the color misregistration between the RGB components, the color producing the maximum color misregistration varied in accordance with the coordinate positions of the pixels. These phenomena occur symmetrically with respect to the center of the sensor (i.e., the center of the optical system or the optical axis of the lens). When an optical system having large aberrations as in this example is used, images are markedly reduced in areas away from the center to the ends of the images in the main scanning direction if the obtained images are not corrected. In addition, color misregistration varying in accordance with the coordinate positions occurs.

The present invention corrects the above-described distortion by performing variable-magnification processing on input images in real time separately for each of the RGB components using scaling factors that vary in accordance with the coordinate positions in raster scanning in the main scanning direction. One raster (one line in the main scanning direction) is divided into a plurality of sections, and different scaling factors are used for different sections. The scaling factor in a certain section is fixed to a certain value $(Q[i+1]-Q[i])/(Dr[i+1]-Dr[i])$ (for the red pixels). This conversion of each raster is performed in real time on image data to which a series of pixel values are sequentially input in raster order according to the following procedure so that effects of aberrations (for example, distortion and chromatic aberration) of optical systems are reduced. With this, pixel displacement as described with reference to FIGS. 12A to 12D can be corrected, and at the same time, color misregistration can also be corrected by performing the processing separately for each of the RGB components.

Outputs from a plurality of line sensors each reading images of a respective one of the RGB components are subjected to analog-to-digital (A/D) conversion, and are sequentially input to image data in the order of raster scanning of the sensors. The image data is subjected to the following real-time variable-magnification processing. Preprocessing such as shading or γ conversion can be performed on the signals subjected to A/D conversion as required before the signals are input to the image data in the order of raster scanning.

(1) The pixel values of the RGB input pixels are temporarily stored in respective low-capacity shift registers by a limited number of pixels in accordance with the maximum amount of the pixel displacement. The shift registers are updated as appropriate.

(2) The coordinate positions and phases of initial pixels to be processed first are set for each of the RGB components.

(3) The pixel values of the input pixels corresponding to the coordinate positions of pixels to be output are read out of the shift registers, and the output pixel values are calculated from the input pixel values and the phases for each of the RGB components. The resultant pixel values of the RGB components are output at the same time.

(4) Every time the pixels are output, the coordinate positions of the input pixels corresponding to the coordinate positions of the pixels to be output next and the phases of the output pixels are recalculated for each of the RGB components, and the process waits for the pixels to be input in the shift registers.

(5) The steps (3) and (4) are repeated on the pixels in one line. An image is processed by repeating the processing for one line in raster order.

During the step (4), all the pixels obtained in a raster scanning are divided into a plurality of sections, and the scaling factors and the number of pixels in each section are set by reflecting the aberration characteristics of the optical system. The coordinate positions of the output pixels are obtained by integrating the inter-pixel distances from the initial coordinate positions. The inter-pixel distances herein refer to ratios of output pixel rates to input pixel rates in real-time variable-magnification processing, and in other words, refer to reciprocal numbers of local scaling factors in certain sections. During processing of a line, variable-magnification processing with different scaling factors is performed by changing the inter-pixel distances in accordance with the sections so that the effects of the aberrations of the optical system are reduced.

Specifically, the inter-pixel distances are changed as follows. A predetermined number (n) of data sets, the number corresponding to that of the sections, each including [additional values] (local inter-pixel distances between each of the RGB pixels in a certain section) and [number of pixels to be processed] (the number of pixels processed in and output from the section) are prepared as a data table in advance. When pixels of [number of pixels to be processed] are output from a certain section and the process proceeds to the next section, the inter-pixel distances are changed so as to correspond to the next section by accessing the data table. This real-time variable-magnification processing does not require high-capacity temporary memories, and can be performed at high speed using memories with minimal capacity. Moreover, even when the input resolution is increased, the size of the required memories is not increased in proportion to the resolution by only increasing the value of [number of pixels to be processed] in accordance with the resolution.

First Exemplary Embodiment

Figure 1:
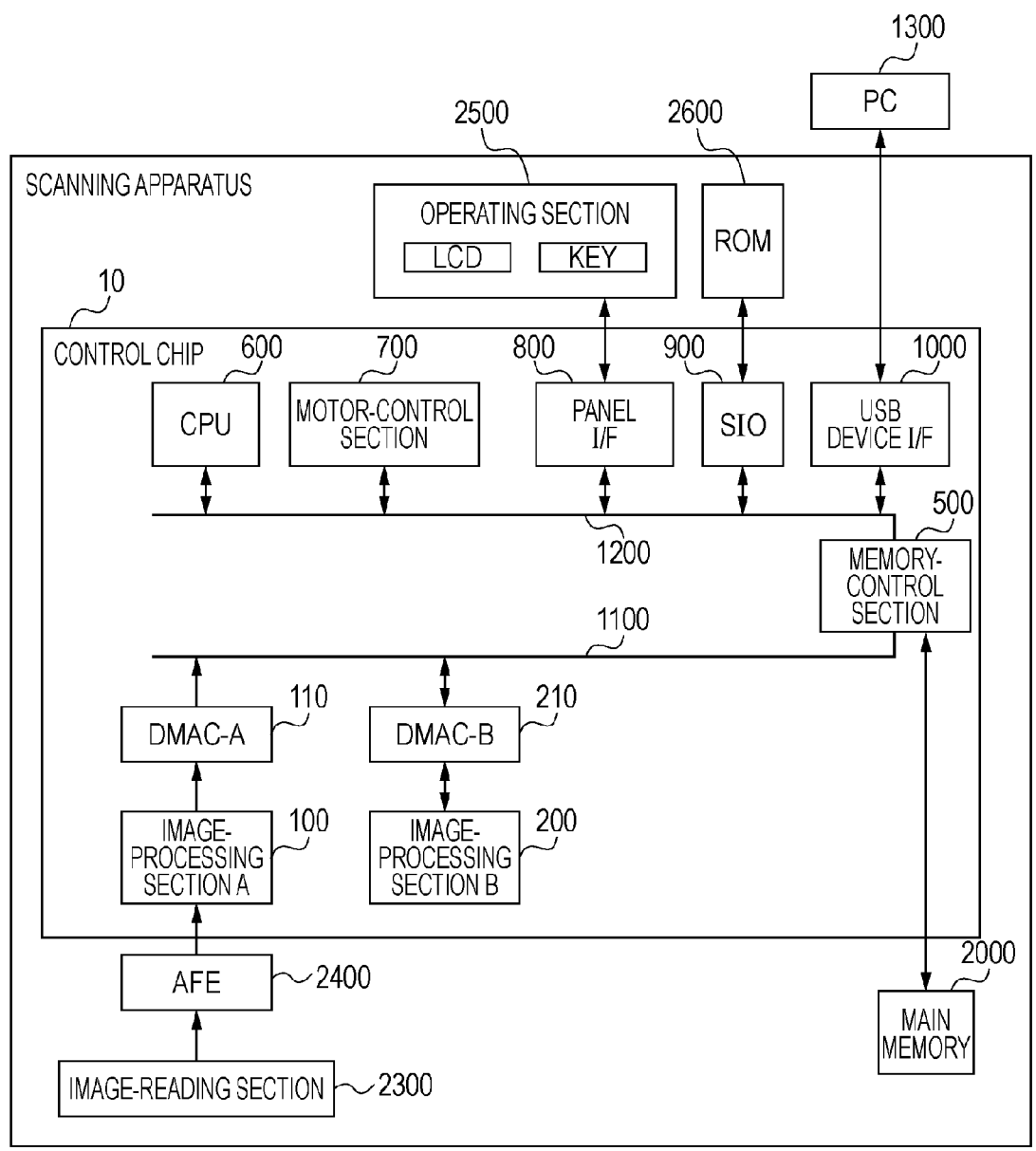
FIG. 1 is a block diagram illustrating the structure of a scanning apparatus.

An image-reading apparatus according to a first exemplary embodiment of the present invention will now be described. The image-reading apparatus to which the present invention is applied can be a single-function scanning apparatus or can be a so-called multifunctional printer including a part functioning as a scanner. FIG. 1 is a block diagram illustrating the structure of a scanning apparatus. A control chip 10 into which a large number of functional blocks enclosed by a rectangle are integrated controls the apparatus. The functional blocks will be described below.

An image-processing section A 100 receives image data in units of lines subjected to A/D conversion at an analog front-end (AFE) 2400 from outside the control chip 10, and performs predetermined image processing applicable to one-line data (processing that does not require image data of a plurality of lines in a sub-scanning direction) such as shading. The result is written in a main memory 2000 via an image bus 1100 and a memory-control section 500 using a direct memory access controller A (DMAC-A) 110.

An image-processing section B 200 reads image data of a plurality of lines out of the main memory 2000 using a direct memory access controller B (DMAC-B) 210, and performs predetermined image processing that requires image data of a plurality of lines such as filtering. The result is again written in the main memory 2000 via the image bus 1100 and the memory-control section 500 using the DMAC-B 210. The memory-control section 500 arbitrates between the image bus 1100, a control bus 1200, and the main memory 2000, and controls the interfaces. The main memory 2000 is used as a working memory by a central processing unit (CPU) 600 and other processing blocks.

The CPU 600 is assigned to control the apparatus. A motor-control section 700 controls a motor that moves an array sensor. A panel interface (I/F) 800 controls an interface with an operating section 2500. A serial input/output (SIO) 900 controls an interface with a read-only memory (ROM) 2600. A USB device I/F 1000 communicates with a personal computer (PC) 1300 outside the scanning apparatus. These blocks are connected to the common control bus 1200.

An image-reading section 2300 includes a reading unit constituted by a reduction optical system and the array sensor and a sub-scanning mechanism that drives the reading unit to scan an original in the sub-scanning direction. Two-dimensional images are read by a combination of raster scanning of the array sensor in the main scanning direction and sub-scanning by the sub-scanning mechanism. The array sensor includes three CCD line sensors each corresponding to one of the RGB components. The array sensor can include additional line sensors that detect other color components such as cyan, magenta, or emerald so as to support more colors in addition to the RGB components. The AFE 2400 performs A/D conversion on analog image data output from the image-reading section 2300 in the order of raster scanning, and outputs signals as image data in units of lines. The signals are input to the image-processing section A 100. The operating section 2500 includes, for example, a liquid-crystal display (LCD) that outputs various information for users of the apparatus and keys (KEY) that are directly operated by the users, and exchanges information with the control chip 10 via the panel I/F 800. The ROM 2600 stores operating programs of the CPU 600.

Figure 2:
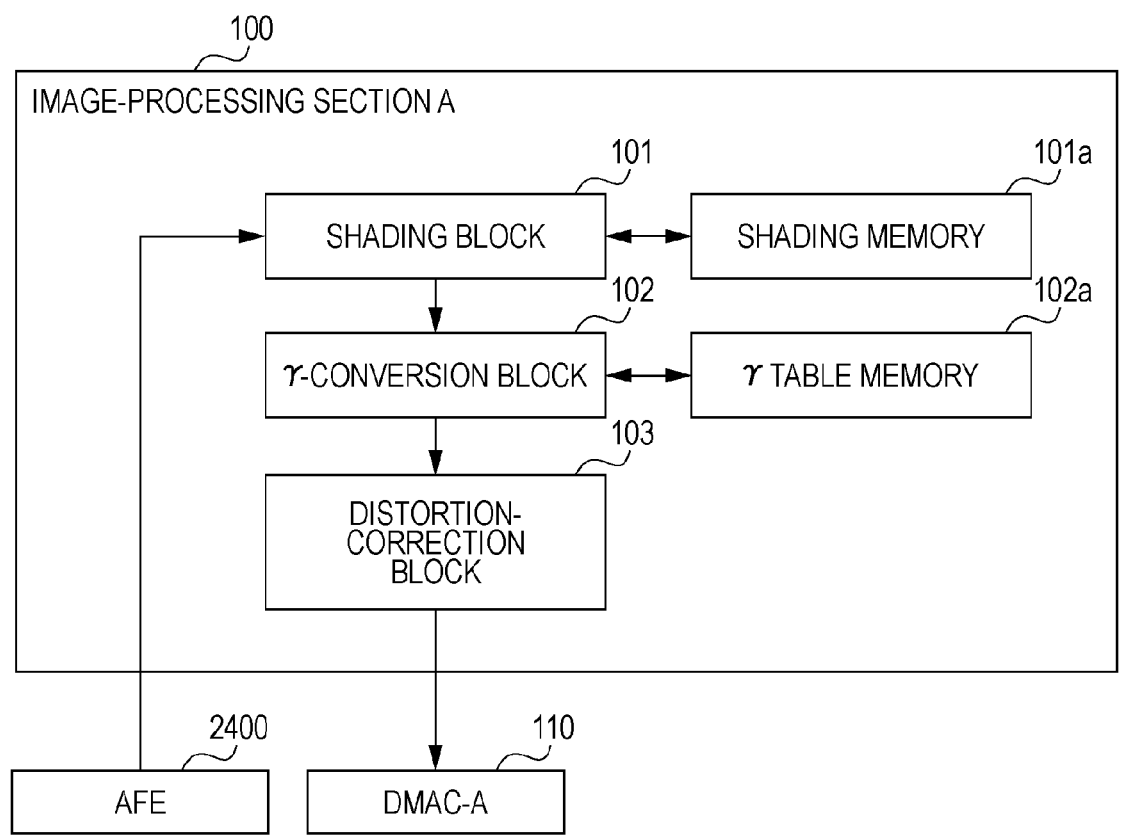
FIG. 2 is a block diagram of an image-processing section A of the scanning apparatus.

FIG. 2 illustrates a configuration of the processing blocks of the image-processing section A 100. A shading block 101 normalizes variations in sensitivity among the pixels of the sensors. A shading memory 101a stores shading data for each of the pixels required during shading. A γ-conversion block 102 corrects brightness characteristics of the shaded and normalized pixel values. A γ table memory 102a stores correspondence data of the brightness characteristics between input/output signals required for γ conversion. A distortion-correction block 103, which is a distinctive feature of the present invention, is a signal-processing unit for reducing the effects of the aberrations of the optical system through digital variable-magnification processing. The processing will be described in detail below.

Figure 3:
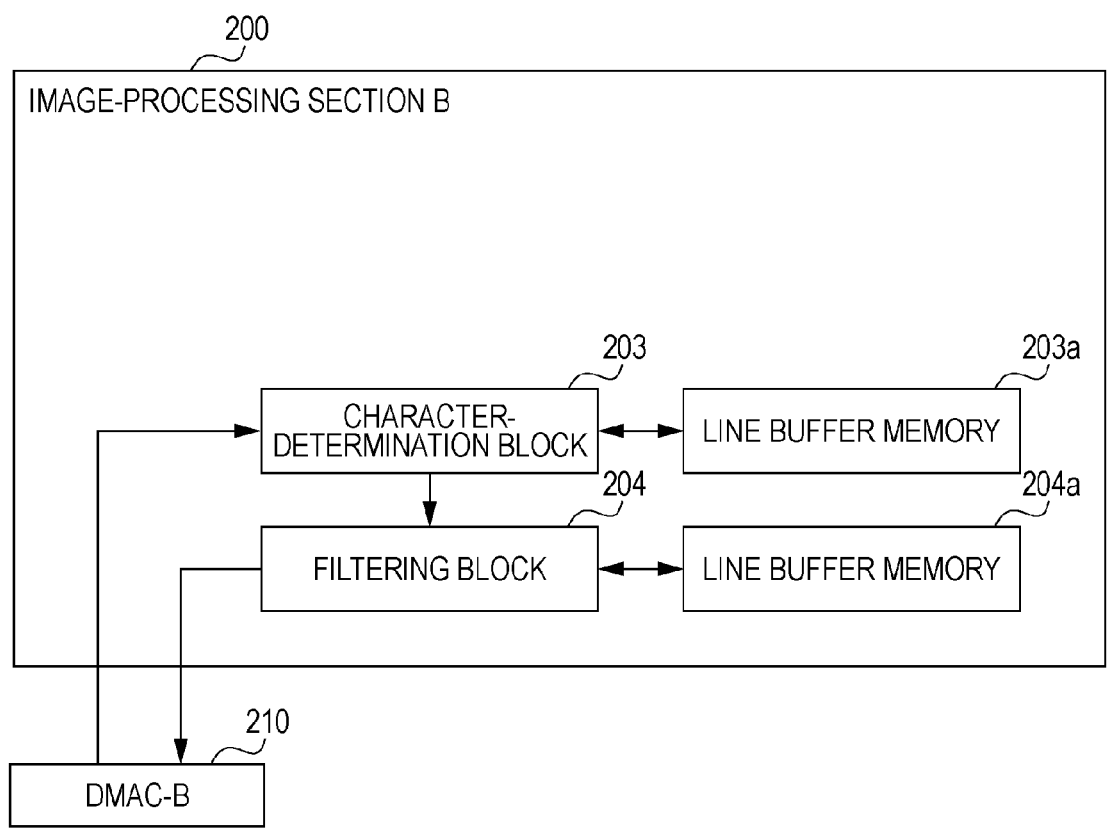
FIG. 3 is a block diagram of an image-processing section B of the scanning apparatus.

FIG. 3 illustrates a configuration of the processing blocks of the image-processing section B 200. A character-determination block 203 examines the values of n×n pixels centering on a certain pixel, and determines whether or not the pixels are a part of a character image. Since this processing requires image data for (n−1) lines in the sub-scanning direction, the corresponding data is stored in a line buffer memory 203a, and is read out therefrom as required for the processing. A filtering block 204 performs edge enhancement or moire suppression by filtering operation using the values of m×m pixels centering on a certain pixel. Since this processing requires image data for (m−1) lines in the sub-scanning direction as does the character-determination block 203, the corresponding data is stored in a line buffer memory 204a, and is read out therefrom as required for the processing.

Figure 4:
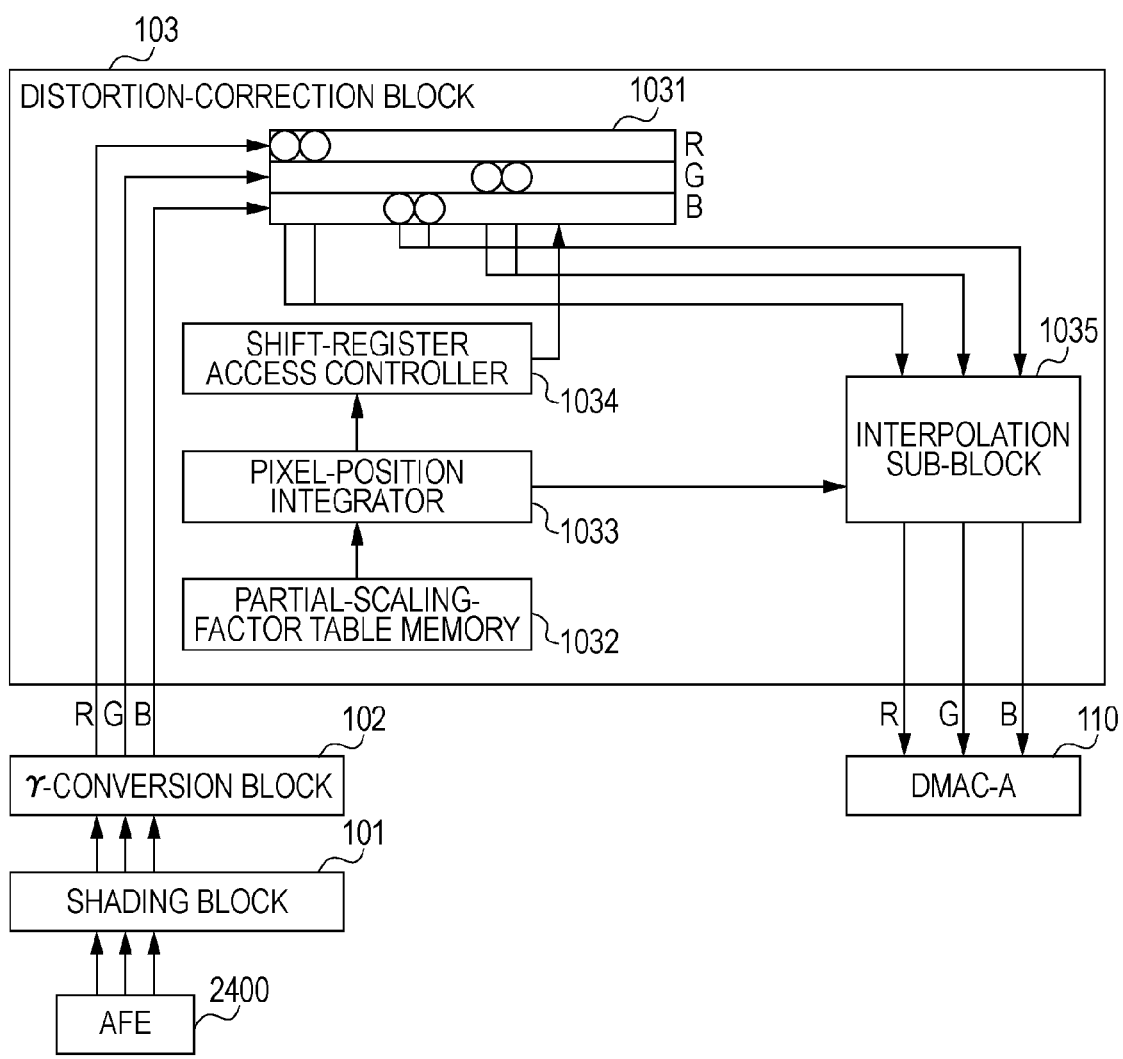
FIG. 4 is a block diagram illustrating an internal configuration of a distortion-correction block.

FIG. 4 illustrates a configuration of the processing blocks of the distortion-correction block 103 shown in FIG. 2. The distortion-correction block 103 functions as a sample-rate converter that changes sampling intervals in each section, the signals being spatially sampled as pixel lines by reading original images projected onto the line sensors in the image-reading section. RGB image signals are sequentially input from the γ-conversion block 102 to the distortion-correction block 103 via first RGB signal lines (corresponding to an input unit). Shift registers 1031 temporarily store the RGB image data of several pixels input in the order of raster scanning. The shift registers are memories that temporarily store the values of a limited number of input pixels in input order, the number being smaller than that of all the pixels in a raster scanning.

A partial-scaling-factor table memory 1032 holds n data sets of information ([additional value] (described below)) that indicates partial scaling factors of the output pixels with respect to the input pixels of each of the RGB components and the number of pixels to be output that are processed with the scaling factors ([number of pixels to be processed] (described below)). This data table reflects the aberration characteristics of the reduction optical system therein. The partial-scaling-factor table memory 1032 is connected to a CPU bus, and the CPU 600 can read and write the contents of the table. A pixel-position integrator 1033 integrates the coordinate positions of the RGB pixels to be output with respect to those of the input pixels in units of sub-pixels on the basis of the data read from the partial-scaling-factor table memory 1032. A shift-register access controller 1034 updates the shift registers 1031, and determines from which coordinate positions in the shift registers 1031 the RGB pixel data is read out in accordance with the results of the pixel-position integrator 1033. An interpolation sub-block 1035 calculates the pixel values to be output for each of the RGB components using two pixel values among those of the RGB pixels read out of the shift registers 1031 in accordance with the control of the shift-register access controller 1034 and the coordinate positions obtained at the pixel-position integrator 1033. The calculation results are sequentially output to the DMAC-A 110 as image signals via second RGB signal lines (corresponding to an output unit).

A signal-processing technique for reducing the effects of aberrations of the optical system through the real-time digital variable-magnification processing will now be described in detail.

Figure 5:
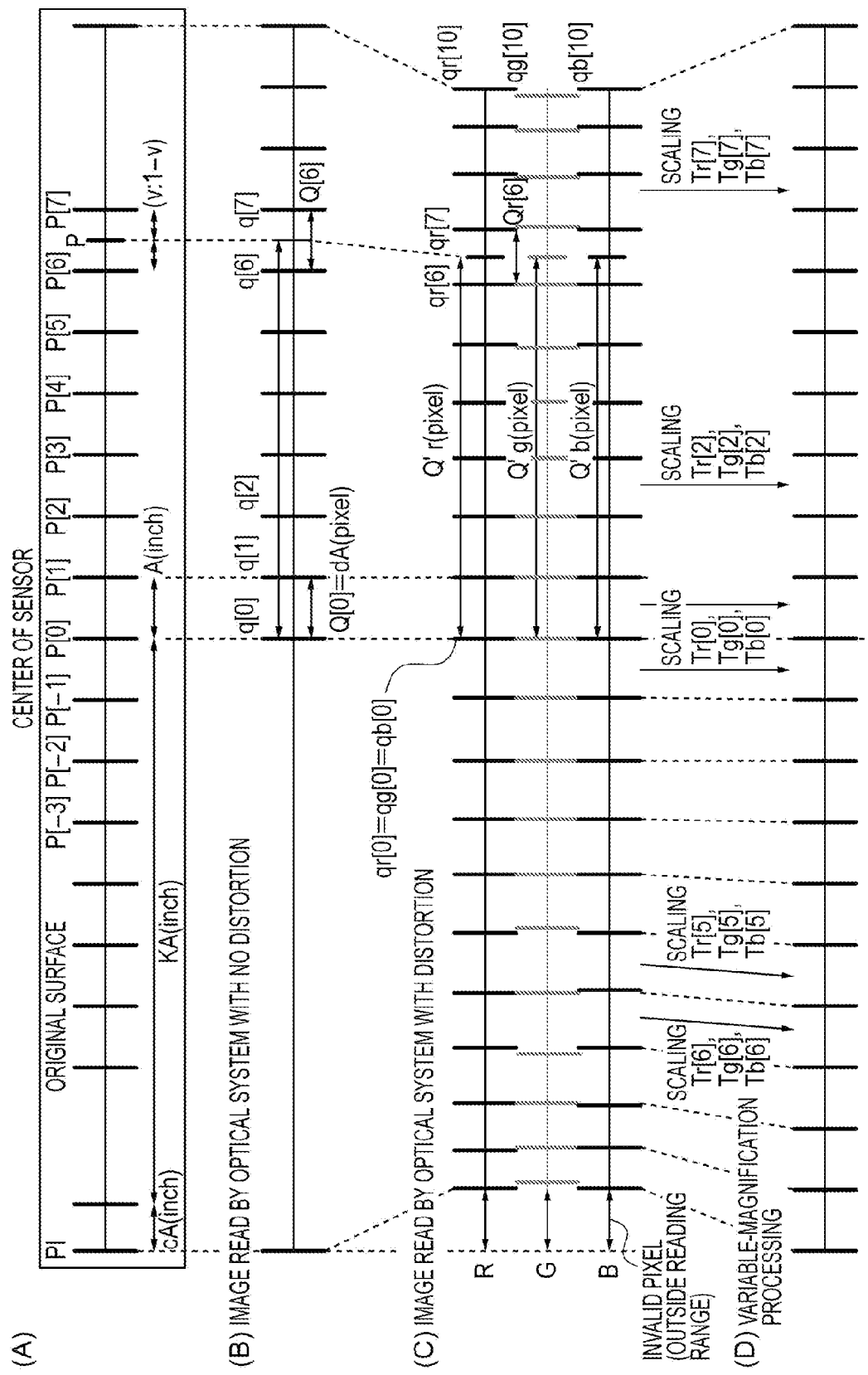
FIGS. 5A to 5D illustrate how distortion is corrected.

FIG. 5A illustrates an original on which points P[i] (where i is an integer, i=−10, . . . , 10) are drawn in increments of A inches in the main scanning direction. FIG. 5B illustrates read images obtained by reading the original at a resolution d (dpi) using a distortion-free ideal optical system having no aberrations. FIG. 5C illustrates read images obtained by reading the original at the resolution d (dpi) using a practical optical system having distortion. The position of the original is adjusted such that the point P[0] is located at the center of a sensor. Since the optical distortion caused by aberration occurs axisymmetrically with respect to the center of the sensor, only a half part (i≧0) will be considered below. In reality, symmetrical processing is performed on the former part and the latter part of a line. In FIG. 5B, read images of the points P[i] are defined as q[i], and the distances (the numbers of pixels) between q[i] and q[i+1] are defined as Q[i]. Since the images are read by a distortion-free ideal optical system, the distances Q[i] are fixed to a certain value dA regardless of i. Similarly, in FIG. 5C, read red images of the points P[i] are defined as qr[i], and the distances (the numbers of pixels) between qr[i] and qr[i+1] are defined as Qr[i].

The distances between q[0] and q[i] are i·Q[0] pixels, and the distances between qr[0] and qr[i] are i·Q[0]−Dr[i] pixels from the data of the amounts of the pixel displacement shown in FIG. 12D. Accordingly, the following expression can be obtained:

$$Qr[i]=(i+1)Q[0]-Dr[i+1]-(iQ[0]-Dr[i])=Q[0]+Dr[i]-Dr[i+1]$$

Due to the distortion of the optical system, the distances (the numbers of pixels) between q[i] and q[i+1] are reduced from Q[0] obtained when the optical system has no distortion to Qr[i]/Q[0](=1+(Dr[i]−Dr[i+1])/Q[0]) times. These values are defined as 1/Tr[i]. Similarly, these ratios for green and blue are defined as 1/Tg[i] and 1/Tb[i], respectively.

When the point corresponding to the left end of the sensor on the original surface is defined as Pl, and the distance L (inches) between P[0] and Pl satisfies L=(K+c)A (where K is an integer, $0 \leq c < 1$), the amounts of the pixel displacement (initial amounts of the pixel displacement) DLr, DLg, and DLb of the read RGB images of Pl obtained using an optical system with distortion can be approximated to the following expressions:

$$DLr=(1-c)Dr[K]+cDr[K+1]$$

$$DLg=(1-c)Dg[K]+cDg[K+1]$$

$$DLb=(1-c)Db[K]+cDb[K+1]$$

When an optical system with distortion is used, invalid pixels (corresponding to an area outside the reading range of the original) of the above-described numbers from the end of the sensor are input to the image data.

Figure 6:
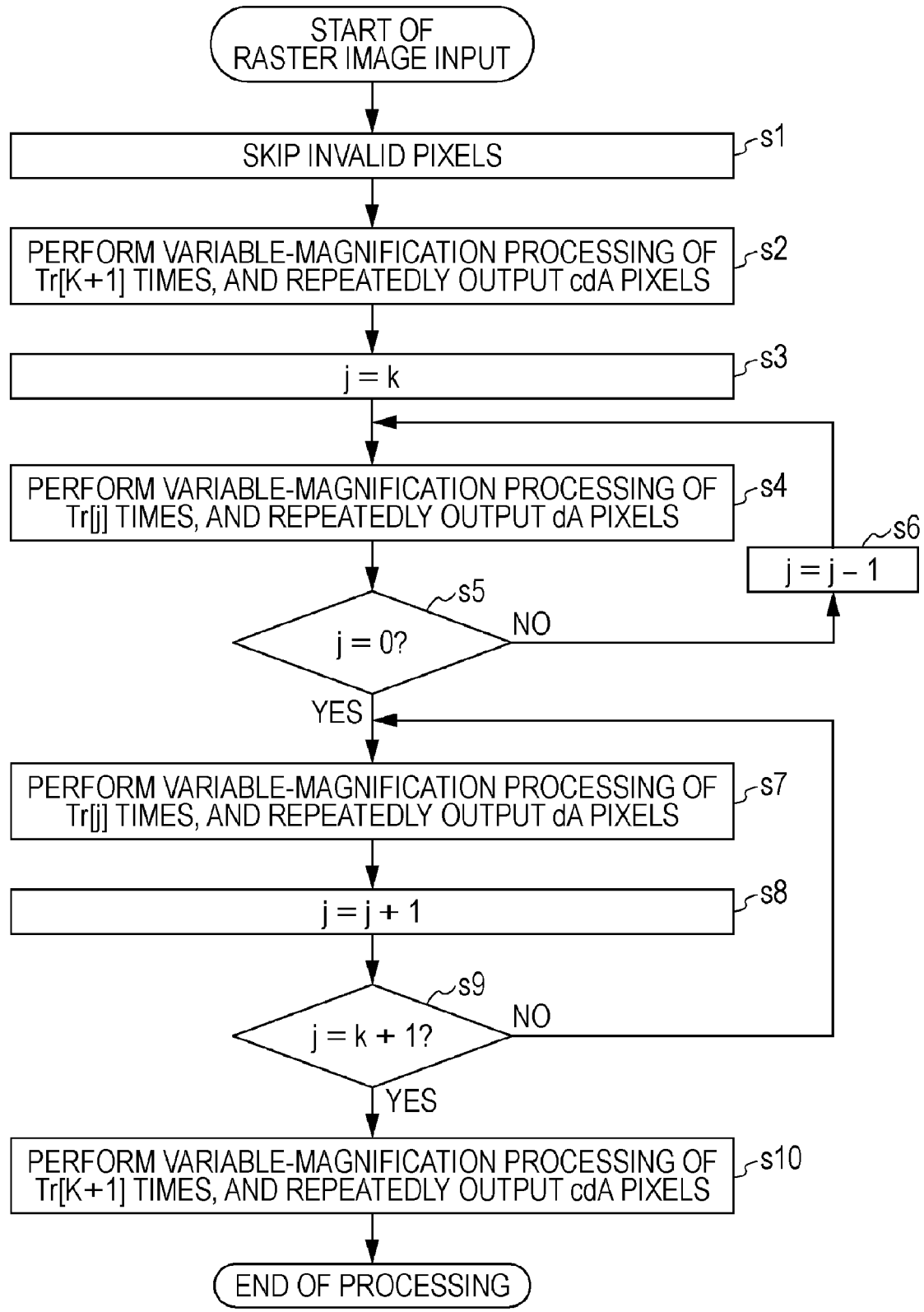
FIG. 6 is a flow chart illustrating procedure for correcting distortion.

These read images are corrected according to the process flow shown in FIG. 6. Only the processing for red pixels will be described in detail.

- s1: DLr input pixels corresponding to initial amounts of pixel displacement are skipped from the first input pixel.
- s2: Variable-magnification processing of Tr[K+1] times is performed on the input pixels in input order, and c·dA (fixed value) pixels are sequentially output.
- s3: j=K.
- s4: Variable-magnification processing of Tr[j] times is performed on the input pixels in input order, and dA (fixed value) pixels are sequentially output.
- s5: When j=0, the process proceeds to s7.
- s6: j=j−1, and the process returns to s4.
- s7: Variable-magnification processing of Tr[j] times is performed on the input pixels in input order, and dA (fixed value) pixels are sequentially output.
- s8: j=j+1.
- s9: When j=K+1, the process proceeds to s10, otherwise the process returns to s7.
- s10: Variable-magnification processing of Tr[K+1] times is performed on the input pixels in input order, and c·dA (fixed value) pixels are sequentially output.

In parallel with the above-described processing for the red component, the variable-magnification processing using the initial amount of the pixel displacement of DLg and DLb and the scaling factors of Tg[i] and Tb[i] is performed on the input pixels of green and blue, respectively. In this manner, image data whose distortion is corrected as shown in FIG. 5D can be generated from the image data shown in FIG. 5C.

The above-described procedure will be summarized. First, images input in the order of raster scanning are skipped by the numbers of pixels corresponding to the initial amount of the pixel displacement. Subsequently, the variable-magnification processing with scaling factors that vary in accordance with the RGB components is performed, and the scaling factors are changed every time predetermined numbers of pixels are output. In this manner, images whose pixel displacement and color misregistration are corrected can be obtained. Since the optical distortion of a reduction optical system occurs axisymmetrically with respect to the center of the sensor, the scaling factors are changed from Tr[K+1] to Tr[K], Tr[K−1], . . . , Tr[1], Tr[0], Tr[0], Tr[1], Tr[2], . . . , Tr[K], and to Tr[K+1] every time dA (fixed value) pixels are output during the processing indicated by the flow chart shown in FIG. 6. That is, symmetrical processing is performed on the former part and the latter part of a line (a raster output).

FIGS. 7A and 7B are conceptual diagrams of interpolation during the digital variable-magnification processing. Herein, processing for outputting the initial pixel at the left end and the next pixel will be described. The method for calculating the initial amounts of the pixel displacement DLr (pixels) for the red component has been described above. Herein, the integer part of this value is defined as skip_pix_r, and the decimal part is defined as first_phase_r. The parameter first_phase_r indicates a phase. When an optical system with distortion is used, the pixel corresponding to the left end Pl of the original is located at a coordinate position between a (skip_pix_r)th red input pixel from the first input pixel and a (skip_pix_r+1)th red input pixel, or more precisely, located at a coordinate position obtained by dividing the space between the two input pixels in a ratio of (first_phase_r):(1−first_phase_r). Therefore, the pixel value Rl of the output pixel corresponding to Pl can be determined from the two input pixel values, that is, the pixel value R0 of the (skip_pix_r)th red input pixel and the pixel value R1 of the (skip_pix_r+1)th red input pixel using the following interpolation operation:

$$Rl=R0 \cdot (1-\text{first\_phase\_}r)+R1 \cdot \text{first\_phase\_}r$$

Next, a value of a pixel to be output next to Pl is determined. The scaling factor for the red component in the vicinity of Pl is Tr[K+1]. The coordinate position of a pixel corresponding to a point located 1/d inches (a reciprocal of the scanner resolution, that is, corresponding to the width of a pixel in a read image without optical distortion) to the right of Pl on the original is located at DLr+(1/Tr[K+1]) (pixels) away from the first input pixel. Herein, the value added to DLr is referred to as an inter-pixel distance between adjacent red pixels. When the coordinate position of the pixel corresponding to the point next to Pl is divided into an integer part and a decimal part, the coordinate position of an input pixel corresponding to that of the output pixel can be determined from the integer part and the phase can be determined from the decimal part. Thus, the output pixel value can be calculated using the same interpolation operation as that used for determining Rl. This is equivalent to performing the variable-magnification processing with the scaling factor of Tr[K+1] on the red pixels in the vicinity of Pl. By repeating this, c·dA (fixed value) pixels are sequentially output. Subsequently, the scaling factor is changed from Tr[K+1] to Tr[K], and the processing is repeated until dA (fixed value) pixels are output (see FIG. 6). According to the above-described procedure, a string of the output pixels for a raster, the distortion of the pixels being corrected, can be obtained from a string of the input pixels for a raster. The same processing is concurrently performed on the other color components of green and blue so that the output images of all the RGB components are obtained.

Next, the processing procedure in the distortion-correction block 103 will be described in detail. Parameters in the following items (1), (2), and (3) are calculated in advance from the initial amounts of the pixel displacement DLr, DLg, and DLb and the partial scaling factors Tr[i], Tg[i], and Tb[i] (i=0, . . . , K) in the sections between the points P[i] and P[i+1].

(1) skip_pix_r, skip_pix_g, and skip_pix_b: integer parts of DLr, DLg, and DLb, respectively.

(2) first_phase_r, first_phase_g, and first_phase_b: decimal parts of DLr, DLg, and DLb, respectively.

(3) xr[j], xg[j], and xb[j]: inter-pixel distances between red, green, and blue pixels, respectively, in each section ($0 \leq j \leq 2K-1$).

Where xr[j]=1/Tr[K−j], xg[j]=1/Tg[K−j], and xb[j]=1/Tb[K−j] when $j \leq K$, and xr[j]=1/Tr[K+1+j], xg[j]=1/Tg[K+1+ j], and xb[j]=1/Tb[K+1+j] when K<j<2K. Herein, the axisymmetric property of Tr[i] with respect to the center of the sensor is used for changing i to j in the item (3). Since the image input starts from the left end of the original, the order of the sections corresponding to each i are changed to that from the left end of the sensor. The parameters in the items (1) and (2) are set in a register in the pixel-position integrator 1033. Concerning the parameters in the item (3), a data table including a plurality of (2K+1) data sets of [number of pixels to be processed], [additional red value], [additional green value], and [additional blue value] is created and written in the partial-scaling-factor table memory 1032 in the following form. This data table reflects the aberration characteristics of the optical system therein.

Data table

| j | Number of output pixels in each section [Number of pixels to be processed] | Inter-pixel distance between adjacent red pixels [Additional red value] | Inter-pixel distance between adjacent green pixels [Additional green value] | Inter-pixel distance between adjacent blue pixels [Additional blue value] |
|---|---|---|---|---|
| 0 | outpix[0] | xr[0] | xg[0] | xb[0] |
| 1 | outpix[1] | xr[1] | xg[1] | xb[1] |
| 2 | outpix[2] | xr[2] | xg[2] | xb[2] |
| . | | | | |
| . | | | | |
| . | | | | |
| 2K – 2 | outpix[2K – 2] | xr[2K – 2] | xg[2K – 2] | xb[2K – 2] |
| 2K – 1 | outpix[2K – 1] | xr[2K – 1] | xg[2K – 1] | xb[2K – 1] |
| 2K | outpix[2K] | Any value | Any value | Any vale |

Herein, the number of output pixels in each section ([number of pixels to be processed]) is defined as outpix[j], and refers to the number of pixels processed in and output from a section j. The inter-pixel distance between adjacent red pixels ([additional red value]), the inter-pixel distance between adjacent green pixels ([additional green value]), and the inter-pixel distance between adjacent blue pixels ([additional blue value]) are predetermined additional values used during processing in the section j. In the example shown in FIGS. 5A to 5D, outpix[j] is set as follows:

$$\text{outpix}[j]=c \cdot dA \text{ (when } j=0 \text{ or } 2K-1\text{)}$$

$$\text{outpix}[j]=dA \text{ (when } 1 \leq j \leq 2K-2\text{)}$$

Moreover, outpix[j] functions as a flag for determining the end of the processing of one raster by setting outpix[j] to zero when j equals 2K. In order to improve the precision, outpix[j] (value dA) can be variable in accordance with j instead of being fixed when $1 \leq j \leq 2K-2$. With this, the data table can reflect the aberrations of the optical system therein more precisely.

Figures 8, 8A, 8B:
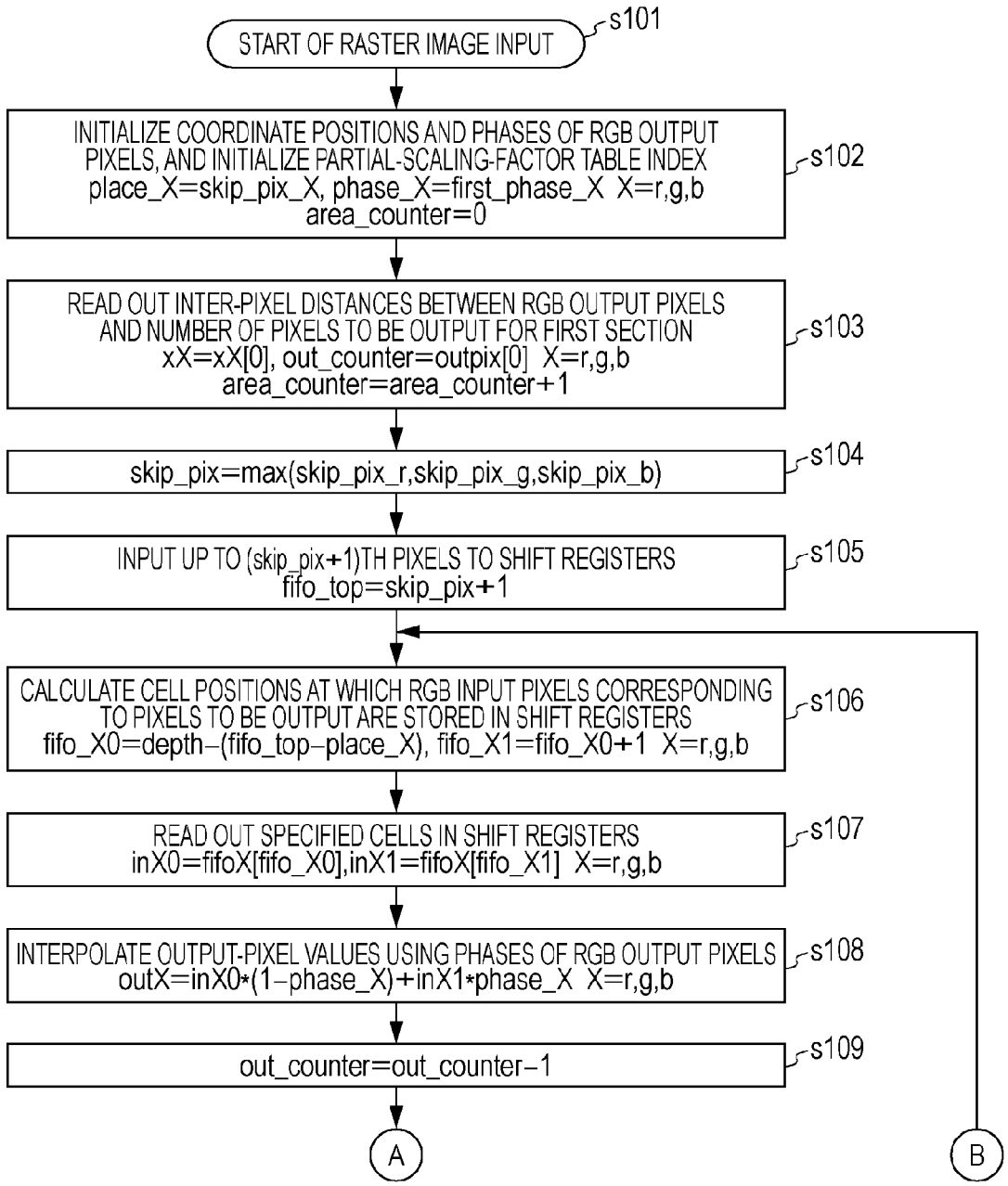
FIG. 8 is a flow chart illustrating the procedure for correcting distortion in detail.
Figure 8B:
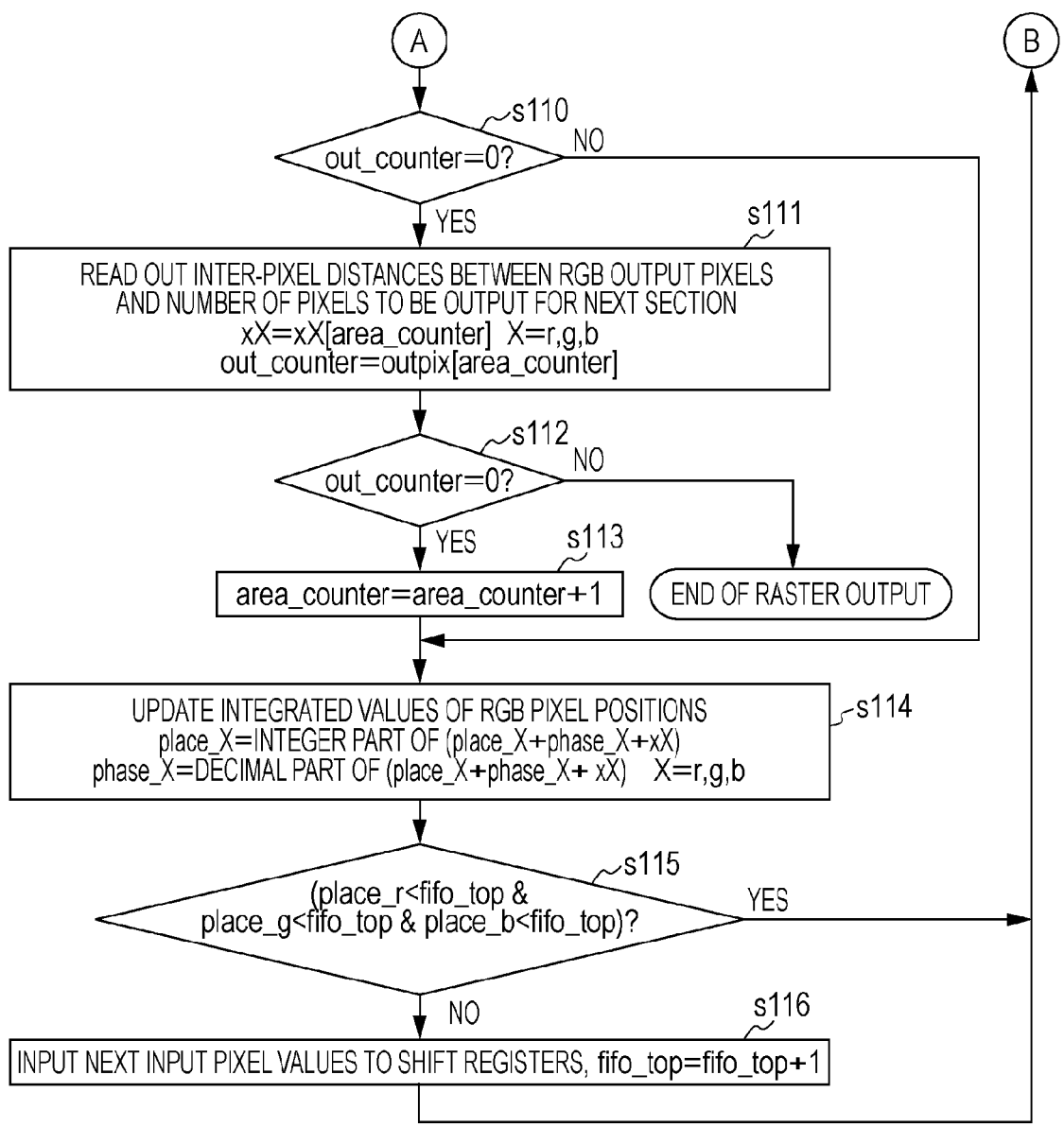
Figure 9:
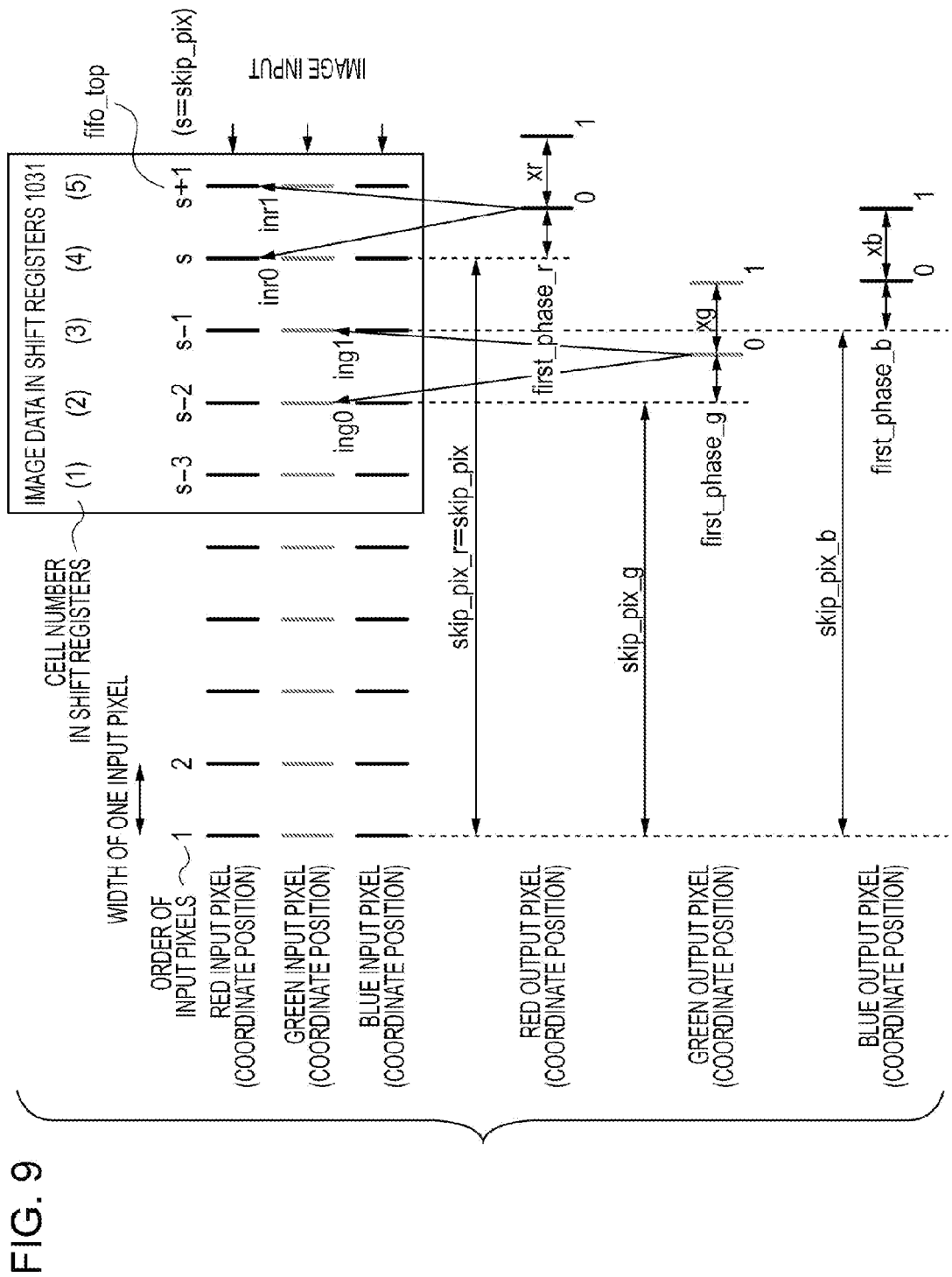
FIG. 9 is a conceptual diagram of processing using shift registers.

FIG. 8 is a flow chart illustrating the processing procedure in the distortion-correction block 103. FIG. 9 illustrates processing using the shift registers. The processing procedure will now be described.

s101: Input of raster images starts. The RGB components of the raster-image data subjected to shading and γ conversion are simultaneously input to the shift registers 1031 on a pixel-by-pixel basis. The number of pixels whose values can be stored in the shift registers is defined as depth. The depth is five in the example shown in FIG. 9.

s102: Internal variables in the pixel-position integrator 1033 are initialized. place_r(g,b) are integrated values of the coordinate positions of output pixels with respect to input pixels, and phase_r(g,b) are the phases of the output pixels with respect to the input pixels. area_counter is a table index value for data-table access, and is increased when the scaling factors are changed:

place_r=skip_pix_r phase_r=first_phase_r place_g=skip_pix_g phase_g=first_phase_g place_b=skip_pix_b phase_b=first_phase_b area_counter=0 s103: First, the pixel-position integrator 1033 accesses an entry 0 (=area_counter) in the data table held by the partial-scaling-factor table memory 1032, and sets the inter-pixel distances between RGB pixels (xr[0], xg[0], and xb[0]) and the number of pixels to be output in the section 0 (outpix[0]) to the internal variables xr, xg, xb, and out_counter, respectively, of the pixel-position integrator 1033.

area_counter=area_counter+1 s104: The maximum value among skip_pix_r, skip_pix_g, and skip_pix_b is set to skip_pix.

s105: Pixel data up to (skip_pix+1)th pixels is input to the shift registers 1031. At this time, an internal value fifo_top that indicates the ordinal position of the newest input pixels in the shift registers from the first pixels of the raster is set to (skip_pix+1).

s106: The following internal variables are updated (calculated) in the pixel-position integrator 1033:

fifo_r0=depth−(fifo_top−place_r)

fifo_r1=fife_r0+1 fifo_g0=depth−(fifo_top−place_g)

fifo_g1=fifo_g0+1 fifo_b0=depth−(fifo_top−place_b)

fifo_b1=fife_b0+1

These values indicate the positions of cells in the shift registers for each of the RGB components, two input pixels corresponding to the pixels to be output being stored in the cells.

s107: The shift-register access controller 1034 accesses the cells specified by fifo_r0 and fifo_r1 in the shift registers 1031 so as to read out the respective red pixel values, and stores the values in variables inr0 and inr1, respectively. In the example shown in FIG. 9, the parameters are set as follows:

depth=5 place_r=skip_pix_r=skip_pix=9 fifo_bottom=10 fifo_r0=4 fifo_r1=5

In other words, the red pixel values stored in the cells (4) and (5) among the five cells in the shift registers 1031 are read out, and stored in inr0 and inr1, respectively. Similarly, the parameters stored in the cells specified by fifo_g0,1 (green) and fifo_b0,1 (blue) are read out and stored in ing0, ing1, inb0, and inb1, respectively.

s108: The interpolation sub-block 1035 receives the values of phases phase_r, phase_g, and phase_b of the output pixels from the pixel-position integrator 1033, and performs the following interpolation operation. Subsequently, the output values outr, outg, and outb for each of the RGB components are simultaneously output to the DMAC-A 110:

out$r$=$inr$0·(1−phase__$r$)+$inr$1·phase__$r$ out$g$=$ing$0·(1−phase__$g$)+$ing$1·phase__$g$ out$b$=$inb$0·(1−phase__$b$)+$inb$1·phase__$b$ s109: out_counter=out_counter−1.

s110: When out_counter=0, the process proceeds to s111, otherwise proceeds to s114.

s111: The pixel-position integrator 1033 accesses the entry of area_counter in the partial-scaling-factor table memory 1032 so as to read out the following values, and sets the values to the internal variables:

xr=xr[area_counter]

xg=xg[area_counter]

xb=xb[area_counter]

out_counter=outpix[area_counter]

s112: When out-counter=0, the raster processing ends, otherwise the process proceeds to s113.

s113: area counter=area counter+1.

s114: The pixel-position integrator 1033 updates the values of the following internal variables for the next output pixels:

place__$r$=integer part of (place__$r$+phase__$r$+$xr$)

phase__$r$=decimal part of (place__$r$+phase__$r$+$xr$)

place__$g$=integer part of (place__$g$+phase__$g$+$xg$)

phase__$g$=decimal part of (place__$g$+phase__$g$+$xg$)

place__$b$=integer part of (place__$b$+phase__$b$+$xb$)

phase__$b$=decimal part of (place__$b$+phase__$b$+$xb$)

s115: When place_r<fifo_top, place_g<fifo_top, and place_b<fifo-top, the process returns to s106, otherwise proceeds to s116.

s116: The next pixels are input to the shift registers 1031, and the process returns to s106.

fifo_top=fifo_top+1

Figure 10:
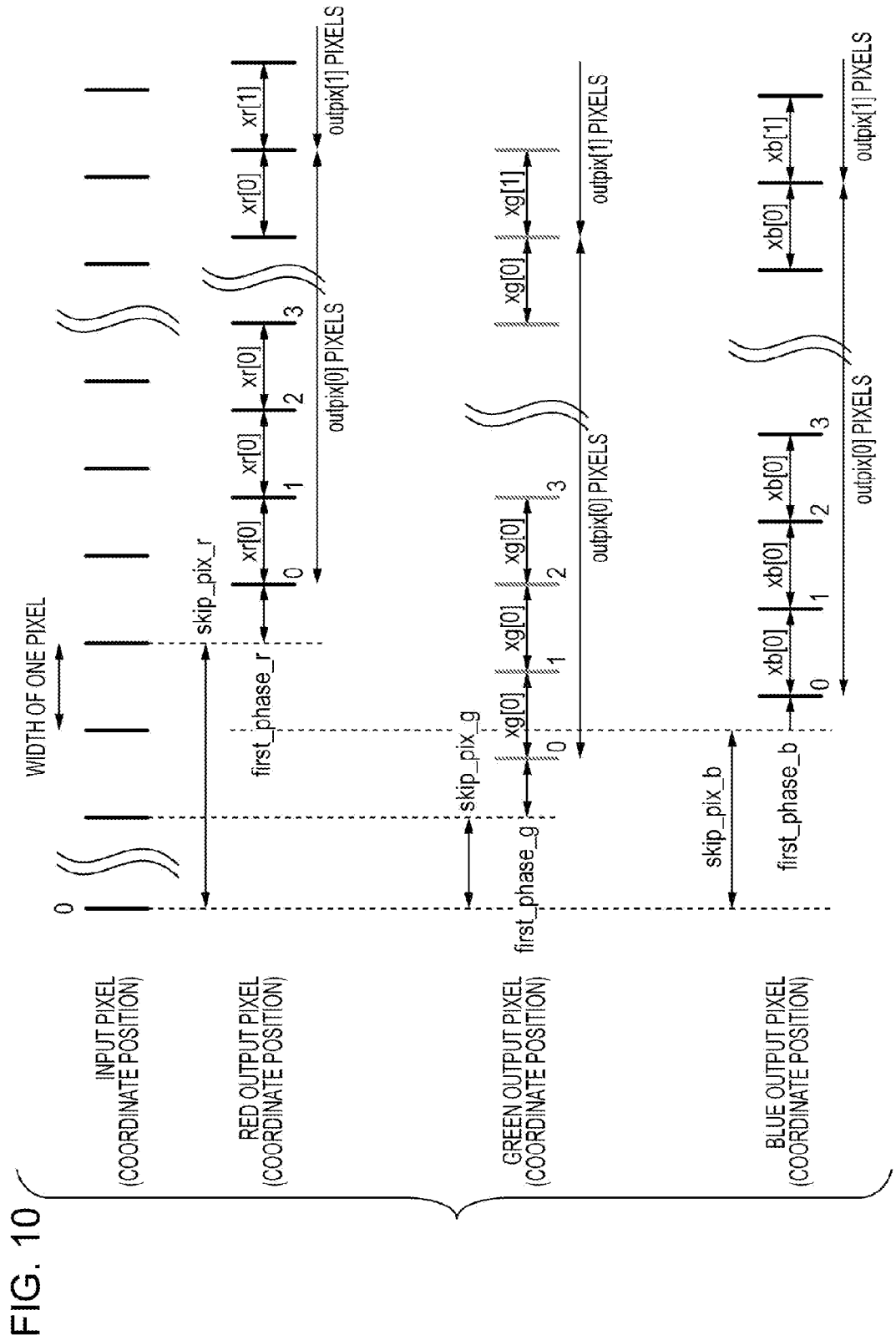
FIG. 10 is a conceptual diagram of processing with scaling factors that vary in accordance with sections.

FIG. 10 illustrates a state during processing in the above-described process flow. The values of the inter-pixel distances xr, xg, and xb between the RGB output pixels with respect to the inter-pixel distances between the input pixels are integrated onto the initial coordinate positions 0, which are expressed by skip_pix_r(g,b) and first_phase_r(g,b), of the RGB output pixels. With this, the coordinate positions of the input pixels (the cell numbers in the shift registers) corresponding to those of the output pixels can be acquired. Subsequently, the pixel values of the output pixels are determined by interpolation operation on the basis of the pixel values of the input pixels (values stored in the shift registers). Herein, every time the predetermined numbers of pixels (outpix[0, 1, ... ]) are output, the values of xr, xg, and xb are changed so that the variable-magnification processing with different scaling factors are performed on each section shown in FIG. 5C. In parallel with the variable-magnification processing, the RGB input pixels are temporarily stored in the respective shift registers, and the positions of the cells to be read in the shift registers are controlled in accordance with the integrated coordinate positions of the RGB pixels. With this, the color misregistration can be corrected at the same time as when the displacements are corrected.

In the above description, the pixel value of each of the next output pixels is determined by phase-weighted interpolation from the pixel values of two input pixels at the coordinate positions nearest to and second nearest to the coordinate position of each of the next output pixels. Alternatively, nearest pixels can be selected by comparing the phases of two pixels adjacent to each of the output pixels, and the pixel values of the nearest pixels can be output without being processed. That is, the pixel values of the input pixels at the coordinate positions nearest to those of the next output pixels (nearest pixels) can be set as the pixel values of the next output pixels. What is common to these methods is that the pixel values of the next output pixels are determined using at least the pixel values of the input pixels at the nearest coordinate positions corresponding to the coordinate positions of the next output pixels.

As described above, the image-reading apparatus according to the first exemplary embodiment of the present invention having a markedly simple configuration can reduce the displacement and the color misregistration serving as the effects of aberrations of the optical system without high-capacity memories. Moreover, the image-reading apparatus is smaller than known apparatuses, and can be realized at low costs.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-231191, filed Sep. 9, 2008, which is hereby incorporated by reference herein in its entirety.

What is claimed is:

1. An image-reading apparatus that reads an image of an original comprising:
    an array sensor including photoelectric-conversion elements linearly arranged;
    an optical system configured to form the image of the original onto the array sensor;
    a signal-processing circuit configured to convert outputs of the array sensor into digital signals and sequentially output pixel values of pixels that constitute a line;
    a sample-rate converter configured to sequentially receive the pixel values of the pixels that constitute the line output from the signal-processing circuit, convert spatial sample intervals of the line, and output the resultant pixel values;
    a data table created by reflecting aberration characteristics of the optical system therein; and
    a controller configured to control the sample-rate converter using data in the data table.

2. The image-reading apparatus according to claim 1, wherein the sample-rate converter includes a shift register having cells that stores pixel values of at least two adjacent pixels among the sequentially input pixel values and an operation circuit that determines a weighted average of the pixel values of the two adjacent pixels.

3. The image-reading apparatus according to claim 2, wherein the line is divided into a plurality of sections, and the data table stores data on a scaling factor and the number of converted pixels for each of the sections set by reflecting the aberration characteristics therein and provided for the sample-rate converter.

4. The image-reading apparatus according to claim 3, wherein the controller specifies the two adjacent pixels from the sequentially input pixels on the basis of an integer part of an accumulated value of reciprocals of the scaling factors, and calculates a coefficient of the weighted average on the basis of a decimal part of the accumulated value.

5. The image-reading apparatus according to claim 1, wherein the controller performs control such that the former part and the latter part of the line are subjected to symmetrical processing.

6. The image-reading apparatus according to claim 1, wherein the array sensor includes a plurality of line sensors each reading a respective one of color components for reading color images, and the sample-rate converter converts the sample intervals for each of the color components.

7. The image-reading apparatus according to claim 1, wherein the aberration refers to distortion and chromatic aberration of the optical system.

8. An image-reading apparatus that reads an image of an original comprising:
    an array sensor including photoelectric-conversion elements linearly arranged;
    an optical system configured to form the image of the original onto the array sensor;
    a signal-processing circuit configured to convert outputs of the array sensor into digital signals and sequentially output converted pixel values;
    a correction circuit configured to sequentially receive a line of the pixel values output from the signal-processing circuit and sequentially output corrected pixel values of the line at the same time, the line being divided into a plurality of sections; and
    a data table created by reflecting aberration characteristics of the optical system therein and including the number of output pixel values and a coefficient for each of the sections,
    wherein the correction circuit includes a shift register that temporarily stores a plurality of pixel values that are sequentially input and a calculation circuit that reads out a plurality of pixel values from the shift register and calculates and outputs corrected pixel values, and
    wherein each of the coefficients in the data table is an interval between positions on the input pixel line corresponding to the output pixel line in each of the sections, and correction operation for the corrected pixel values in the calculation circuit is performed on the basis of an accumulated value of the coefficients.

* * * * *